(12) United States Patent
Koh

(10) Patent No.: US 6,363,183 B1
(45) Date of Patent: Mar. 26, 2002

(54) RECONFIGURABLE AND SCALABLE INTERGRATED OPTIC WAVEGUIDE ADD/DROP MULTIPLEXING ELEMENT USING MICRO-OPTO-ELECTRO-MECHANICAL SYSTEMS AND METHODS OF FABRICATING THEREOF

(75) Inventor: Seungug Koh, 2209 Lily Dr., Ruston, LA (US) 71270

(73) Assignee: Seungug Koh, Sunnyvale, CA (US)

( * ) Notice: Subject to any disclaimer, the term of this patent is extended or adjusted under 35 U.S.C. 154(b) by 0 days.

(21) Appl. No.: 09/477,618

(22) Filed: Jan. 4, 2000

(51) Int. Cl.⁷ .............................. G02B 6/35; G02B 6/42
(52) U.S. Cl. .......................... 385/19; 385/14; 385/15; 385/16; 385/17; 385/18
(58) Field of Search ................................ 385/14, 15–20

(56) References Cited

U.S. PATENT DOCUMENTS

| | | | |
|---|---|---|---|
| 4,399,543 A | * 8/1983 | Oughstum | 372/95 |
| 4,955,686 A | 9/1990 | Buhrer et al. | |
| 5,044,745 A | * 9/1991 | Inoue et al. | 385/16 |
| 5,416,861 A | 5/1995 | Koh et al. | |
| 5,690,863 A | * 11/1997 | Shuman | 252/582 |
| 5,694,499 A | 12/1997 | Tillerot et al. | |
| 5,761,350 A | 6/1998 | Koh | |
| 5,832,149 A | 11/1998 | Omizu et al. | |
| 5,892,862 A | 4/1999 | Kidder et al. | |
| 5,920,665 A | 7/1999 | Presby | |
| 5,923,798 A | 7/1999 | Aksyuk et al. | |
| 5,926,588 A | 7/1999 | Murakami et al. | |
| 5,960,131 A | * 9/1999 | Fouquet et al. | 385/17 |
| 5,969,848 A | * 10/1999 | Lee et al. | 359/298 |
| 6,195,478 B1 | * 2/2001 | Fouquet | 385/17 |

OTHER PUBLICATIONS

Martin Hoffman et al., "Optical Fiber Switches Based on Full Wafer Silicon Micromachining," Proceeding:MME 98–Micromechanics Europe, Ulvik, Norway, pp. 96–99, 1998.

(List continued on next page.)

*Primary Examiner*—John D. Lee
*Assistant Examiner*—Jerry T Rahll

(57) ABSTRACT

Over the last several years, the rapidly increasing traffic volume carried by telecommunication networks has been clearly observed as a result of the bandwidth-intensive applications such as Internet access, electronic commerce, multimedia applications, and distributed computing. Optical telecommunication systems employing optical fibers as the transmission medium have exhibited a superior performance/cost ratio for both long-haul and short-haul routes and the emerging dense wavelength division multiplexing (DWDM)/all-optical networks have shown some promising potentials. However there still exists a need to improve speed, capacity and connectivity of optical telecommunication networks, as the information system's subscriber growth increases unrestrained. The present invention provides a reconfigurable and scalable fiber optic switching for optical telecommunication networks by integrating MEMS actuators and PLCs for optical signal switching and routing. The integrated optic waveguide switches and optical cross-connect networks are particularly applicable for DWDM/all-optical networks due to its low cost, small crosstalk, reliable, compact, reconfigurable, modular, scalable, and wavelength/polarization insensitive characteristics. The integrated optic waveguide switch can be configured into a variety of all-optical network component such as Add/Drop switch, optical cross-connect switch array, and Add/Drop DWDM filter by combining MEMS actuators and PLC networks into an integrated hybrid microsystem: Micro-Opto-Electro-Mechanical System (MOEMS).

17 Claims, 12 Drawing Sheets-

OTHER PUBLICATIONS

C. Marxer et al., "Reflective Modulators and By–Pass–Switches: two MEMS Components for Fiber Optic Communication," 1998 IEEE Summer Topical Meetings, Monterey, CA, pp. 27–28, 1998.

Q. Lai et al.,"Low–Power Compact 2X2 Thermooptic Silica–on–Silicon Waveguide Switch with Fast Response," IEEE Photonics Technology Letters, vol. 10, No. 5, pp. 681–683, May 1998.

R. Moosburger et al.,"4X4 Digital Optical Matrix Switch Using Polymeric Oversized Rib Waveguides," IEEE Photonics Technology Letters (PTL), vol. 10, No. 5, pp. 684–686, May 1998.

C.G.P. Herben et al.,"A Compact Integrated InP–Based Single–Phasar Optical Crossconnect," IEEE PTL, vol. 10, No. 5, pp. 678–680, May 1998.

Takashi Goh et al.,"High–Extinction Ratio and Low–Loss Silica–Based 8X8 Thermooptic Matrix Switch," IEEE PTL, vol. 10, No. 3, pp. 358–360, Mar. 1998.

Takashi Goh et al., "Low–Loss and High–Extinction Ratio Silica–Based Strictly Nonblocking 16X16 Thermooptic Matrix Switch," IEEE PTL, vol. 10, No. 6, pp. 810–812, Jun. 1998.

B. Barber et al.,"A Fiber Connectorized MEMS Variable Optical Attenuator," IEEE PTL, vol. 10, No. 9, pp. 1262–1264, Sep. 1998.

L.Y. Lin et al., "High–Density Micromachined Polygon Optical Crossconnects Exploiting Network Connection Symmetry," IEEE PTL, vol. 10, No. 10, pp. 1425–1427, Oct. 1998.

Cronel Marxer et al., "A Variable Optical Attenuator Based on Silicon Micromechanics," IEEE PTL, vol. 11, No. 2, pp. 233–235, Feb. 1999.

Neil A. Jackman et al.,"Optical Cross Connects for Optical Networking ," Bell Labs Technical Journal, pp. 262–281, Jan.–Mar. 1999.

D. Bruce Buchholz et al., "Broadband Fiber Access: A Fiber–to–the–Customer Access Architecture," Bell Labs Technical Journal, pp. 282–299, Jan.–Mar. 1999.

C. Randy Giles et al., "The Wavelength Add/Drop Multiplexer for Lightwave Communication Networks," Bell Labs Technical Journal, pp. 207–229, Jan.–Mar. 1999.

Masayuki Okuno et al., "Silica–Based 8X8 Optical Matrix Switch Integrating New Switching Units with Large Fabrication Tolerance," IEEE/OSA JLT, vol. 143, No. 5, pp. 771–779, May 1999.

Y.P. Li et al., "Silica–based optical integrated circuits," IEE Proceedings–Optoelectron, vol. 143, No. 5, pp. 263–280, Oct. 1996.

M. Kawachi, "Recent progress in silica–based planar lightwave circuits on silicon," IEE Proceedings–Optoelectron, vol. 143, No. 5, pp. 257–262, Oct. 1996.

C.A. Jones et al.,"Hybrid integration onto silicon motherboards with planar silica waveguides," IEE Proceedings–Optoelectron, vol. 143, No. 5, Oct. 1996.

Cornel Marxer et al.,"Vertical Mirrors Fabricated by Deep Reactive Ion Etching for fiber–Optic Switching Applications," IEEE/ASME Journal of MEMS, vol. 6, No. 3, pp. 277–284, Sep. 1997.

Wen–Han Huan et al., "Released Si Microstructures Fabricated by Deep Etching andShallow Diffusion," IEEE/ASME Journal of MEMS, vol. 5, No. 1, pp. 18–23, Mar. 1996.

Wen–Han Juan et al., "High–Aspect–Ratio Si Vertical Micromirror Arrays for Optical Switching," IEEE/ASME journal of MEMS, vol. 7, No. 2, pp. 207–213, Jun. 1998.

Wen–Han Juan et al., "Controlling sidewall smoothness for micro–machined Si Mirrors and lenses," AVS Journal of Vacuum Science and Technology–B, vol. 14, No. 6, pp. 4080–4084, Nov./Dec. 1996.

Yogesh B. Gianchandani,"A Bulk Silicon Dissolved Wafer Process for Microelectromechanical Devices," IEEE/ASME Journal of MEMS, vol. 1, No. 2, pp. 77–85, Jun. 1992.

William C. Tang et al.,"Electrostatic Comb Drive Levitation and Control Method," IEEE/ASME Journal of MEMS, vol. 1, No. 4, pp. 170–178, Dec. 1992.

Kuniharu Kato et al., "Packaging of Large–Scale Planar Lightwave Circuits," IEEE Transactions on Components, Packaging, and Manufacturing Tech–PartB, vol. 21, No. 2, pp. 121–129, May 1998.

Seungug Koh et al., "Optoelectronic multichip modules for high–speed computer systems and communication networks," SPIE Optical Engineering, vol. 36, No. 5, pp. 1319–1325, May 1997.

Seungug Koh et al.,"Synchronous global clock distribution on Multichip modules using optical waveguides," SPIE Optical Engineering, vol. 33, No. 5, pp. 1587–1595, May 1994.

* cited by examiner

RECONFIGURABLE AND SCALABLE INTERGRATED OPTIC WAVEGUIDE ADD/DROP MULTIPLEXING ELEMENT USING MICRO-OPTO-ELECTRO-MECHANICAL SYSTEMS AND METHODS OF FABRICATING THEREOF

TECHNICAL FIELD

The present invention relates generally to integrated optic waveguide switch arrays and optical cross-connect networks that contain microelectromechanical system (MEMS) microstructures/actuators and micromachined optical waveguide networks on planar lightwave circuits (PLCs) and it is directed particularly to reconfigurable and scalable all-optical switching for computer systems and telecommunication networks. The invention is specifically disclosed as a Micro-Opto-Electro-Mechanical System (MOEMS) that fabricates MEMS actuators and high-bandwidth PLCs by using well-established lithographic batch processing techniques and subsequently assembles them into integrated optic waveguide switches or optical cross-connect networks.

BACKGROUND OF THE INVENTION

Recently there has been an accelerated integration of computer systems and communication networks in an attempt to satisfy the ever-increasing information processing, transmission, and distribution needs for future computer systems and communication networks. High-performance microprocessors with large integration density, diverse functionality, and high-speed operation capabilities are now in widespread use due to innovative architecture designs and improved silicon fabrication processes. Similarly there has been an increasing demand for better performance in network computing. Over the past several years, the rapidly increasing traffic volume carried by telecommunication networks clearly has been observed, and this is a result of wider use of bandwidth-intensive applications such as Internet access, electronic commerce, multimedia applications, and distributed computing. In accommodating this demand, optical telecommunication systems employing optical fibers as the transmission medium have exhibited a superior performance/cost ratio for both long-haul and short-haul routes to than any other type of telecommunication systems. In particular the emerging dense wavelength-division multiplexing (DWDM) and all-optical network communication systems have shown some promising and exciting potentials. However there still exists a need to improve delay, bandwidth, and connectivity of optical telecommunication networks, as the information system's subscriber growth continues unrestrained.

Although fiber optic cables for both long-haul and short-haul routes increasingly have been deployed by telecommunication service providers, the ever-increasing network traffic has created some constraints on communication network in terms of speed, capacity, and connectivity of networks. Telecommunication service providers have addressed these speed, capacity and connectivity constraints by either installing new fiber cables or by expanding the transmission capacity using faster devices or DWDM techniques. While timedivision multiplexing (TDM) increases the transmission speed of optical signals, DWDM increases the number of optical signals, called channels, transmitted simultaneously on a single fiber and it is ideal for high volume point-to-point or backbone links with minimal switching and routing requirements. However, in the emerging DWDM metropolitan and local area networks, the primary concern is not the network capacity but the network connectivity through reconfigurable switching. Regardless of the method used for addressing capacity constraints, the a fiber optic switching will become a major issue for optical telecommunication systems. Since the fiber optic telecommunication technology first became available, many network managers have preferred all-optical networks for benefits in terms of bandwidth, security, and segment length. Optical cross-connect networks can also improve the efficiency of all-optical networks by providing a bit-rate independent and format independent network switching. Without the all-optical networks, the signals of traditional optical telecommunication networks first must be converted from optical to electrical form at switching ports and the routing information in the information packet analyzed and utilized for proper signal routing. Then the signal must be converted to the optical form for a subsequent signal routing and transmission. These optical-to-electrical and optical-toelectrical signal form conversions reduce the overall network efficiencies as it introduces delays and noise.

It is widely believed that the DWDM network is an enabling technology for Internet applications, as the expectations of the Internet's great potential will not be realized without the bandwidth gain provide by DWDM. Direct fiber optic switching without electrical-to-optical or optical-to-electrical conversions is much needed for the all-optical DWDM network. The unprecedented record of growth being generated by Internet traffic and tremendous amount of data being dumped on the public network show no sign of slowing yet. Without optical telecommunication network and optical fiber's seemingly unlimited bandwidth potential as the fundamental transmission technology, the Internet performance will be significantly slowed as the subscriber growth increases unrestrained. Notably there is a need for fiber optic switches for all-optical DWDM networks, which can provide low cost, small crosstalk, reliable, compact, reconfigurable, modular, scalable, and wavelength/polarization insensitive characteristics.

SUMMARY OF THE INVENTION

Accordingly, it is a primary objective of the present invention to provide Micro-Opto-Electro-Mechanical System (MOEMS) for integrated optic waveguide switches and optical cross-connect networks. The MOEMS can deliver low cost, small crosstalk, reliable, compact, modular, scalable, and wavelength/polarization insensitive all-optical switching capabilities by integrating microelectromechanical system (MEMS) actuators and micromachined planar lightwave circuit (PLC) networks.

It is another objective of the present invention to provide a method of constructing integrated optic waveguide switches for two-input/two-output crossbar switching such that it allows a seamless integration of MEMS actuators and micromachined PLCs at the micro scale.

It is yet another objective of the present invention to provide a method of constructing integrated optic waveguide two-input/two-output crossbar switches for an Add/Drop switch and of Add/Drop switch applications.

Another objective of the present invention is to provide a method of constructing reconfigurable, non-blocking, and scalable optical cross-connect switches by using integrated optic waveguide switch arrays and PLC routing networks on MOEMS, which utilizes the inherent MOEMS characteristics: miniaturization, multiplicity, and micro-optoelectronics.

It is a further objective of the present invention to provide a method of constructing multifunction MEMS vertical mirror/filter actuators for DWDM Add/Drop filter and multiplexer applications, which combines out-of-plane vertical mirror or multi-layer thin-film filter plates on MEMS actuators.

It is yet a further objective of the present invention to provide a method of constructing tapered, off-set, and anti-reflection X-crossing boundary conditions for optical waveguide networks as well as providing parallel and non-parallel vertical movable plates in order to reduce insertion losses and to equalize optical signal powers.

It is yet another further objective of the present invention to provide a method of constructing a low power MEMS actuator, which exhibits zero-static power consumption.

Additional objectives, advantages and other novel features of the invention will be set forth in part in the description that follows and in part will become apparent to those skilled in the art upon examination of the following or may be learned with the practice of the invention.

To achieve the foregoing and other objectives, and in accordance with one aspect of the present invention, improved Micro-Opto-Electro-Mechanical Systems (MOEMS) are provided to support the seamless and scalable integration of MEMS actuators and PLCs. Such MOEMS can integrate high-bandwidth waveguide networks of PLCs and miniaturized MEMS microstructures/actuators into a single module.

Some of the essential components for optical communication system are devices that have branching, switching, filtering, and wavelength multiplexing functions. Until recently the majority of these were fabricated using optical fibers or bulk optics, both of which exhibit inherent limitation in size, speed, and large-scale integration capability. To overcome these limitations, many groups around the world have pursued research on planar waveguide network, such as planar lightwave circuits (PLCs) and silicon optical bench (SOB). These names came from the planar geometry of the waveguide circuits and the use of waveguide chips to attach other optoelectronic components. The PLCs have reached a level of development to produce a commercial component that can compete and surpass fiber-optic or bulk-optic components. The silica glass integrated waveguide circuits, made from glass composition similar to that of optical fibers, have shown many benefits such as low transmission losses, direct and low-loss interfacing to optical fibers, and a capability to integrate various devices into a single substrate, such as directional couplers, filters, splitters, combiners, star couplers, multiplexers, demultiplexers, and switches.

Through the use of MOEMS device structures presented in the current invention, a low cost, small crosstalk, reliable, compact, reconfigurable, modular, scalable, and wavelength/polarization insensitive integrated optic waveguide switch array can be fabricated in a lithographic batch process using well-established integrated circuit (IC) fabrication processes. The integrated optic waveguide switch is an integrated hybrid microsystem: MOEMS, which is capable of providing all-optical switching within a PLC platform through the aid of MEMS microstructures/actuators. By combining MEMS actuators (vertical mirror actuators) and micromachined PLCs into a single structure, the normally passive PLC can actively switch optical signals and reconfigure the PLC network connectivity. The integrated optic waveguide switch can utilize a vertical mirror actuator fabricated by a deep silicon reactive ion etch (RIE) process to provide many unique benefits such as scalability, low cost, small crosstalk, compactness, and wavelength/polarization insensitivity. In a current technology, the conventional fiber optic switches require assembly and alignment of multiple optical fibers. The current packaging process for optical fibers and other alignment structures inevitably incurs a non-uniform device performance and a large-scale array expansion of fiber switch is difficult to implement due to a discrete device configuration. Since the integrated optic waveguide switch utilizes lithographically defined integrated optic waveguide network and MEMS actuators as well as simple and single-step packaging processes, it is ideally suited for large-scale fiber switching applications involving an array of input/output fiber ports. The present invention's unique device structure and packaging process renders a simple and single-step alignment operation between vertical mirror actuators and integrated optic waveguides regardless of the number and location of optical switches on the MOEMS platform. This feature is particularly useful to implement the scalable and reconfigurable all-optical communication networks at low cost.

In the emerging DWDM metropolitan and local area networks, the major concern is not the network capacity but the network connectivity. Through its switching capability, an optical Add/Drop switch can either add or drop communicating nodes of telecommunication network systems as the needs for network connectivity change. The number of active nodes in local area network can be dynamically increased or decreased depending on network traffic volume, fairness & priority of individual communicating nodes and so on. Besides the optical Add/Drop switches, the optical cross-connect switch array is another indispensable component for optical communication systems. It can switch and transmit optical signals directly between any input/output ports in both analog and digital formats and in a mixture of multiple data rates without electrical-to-optical or optical-to-electrical signal conversions. Due to the property that photons do not directly interact with each other in contrast with electrons, an optical cross-connect switch can be implemented on a single interconnect layer of PLC by using a planar X-crossing waveguide structure. It is possible to construct a strictly non-blocking cross-connect optical switch array on MOEMS platform by using many popular multistage network structures such as Benes, Omega networks and so on.

The power consumption and multi-functionality of MEMS devices are very important features to allow MOEMS expand and create a large-scale smart microsystem. Small power consumption of MEMS actuator allows a less demanding requirement for power management and device packaging and, subsequently, it facilitates a dense integration of integrated optic waveguide switch array. In general, device power consumption can be classified into dynamic and static power consumption. While it is impossible to eliminate dynamic power consumption, many devices for computer systems and communication networks can achieve zero or near-zero static power consumption as seen in CMOS circuits for VLSI systems. In the present MOEMS invention, an innovative locking mechanism can provide a method of constructing a low power MEMS vertical mirror actuator, which exhibits zero-static power consumption. After a dynamic reconfiguration of switch networks, the Add/Drop switch and cross-connect switch array would not consume any static power due to the use of MEMS lock actuators. It is also possible to implement vertical mirror actuators by using MEMS micro-grippers on linear comb drivers, where the micro-grippers holding vertical mirrors can provide a switching movement through a use of electrostatic comb drivers. By inserting vertical micro mirror or multi-layer thin film filter plates into the micro-grippers, it is possible to accomplish optical signal reflection as well as DWDM channel Add/Drop filtering. The multi-functional MEMS vertical mirror/filter actuator will enhance the functionality and reconfigurability of emerging DWDM metropolitan and local area networks.

Still other objective of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions should be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawing:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
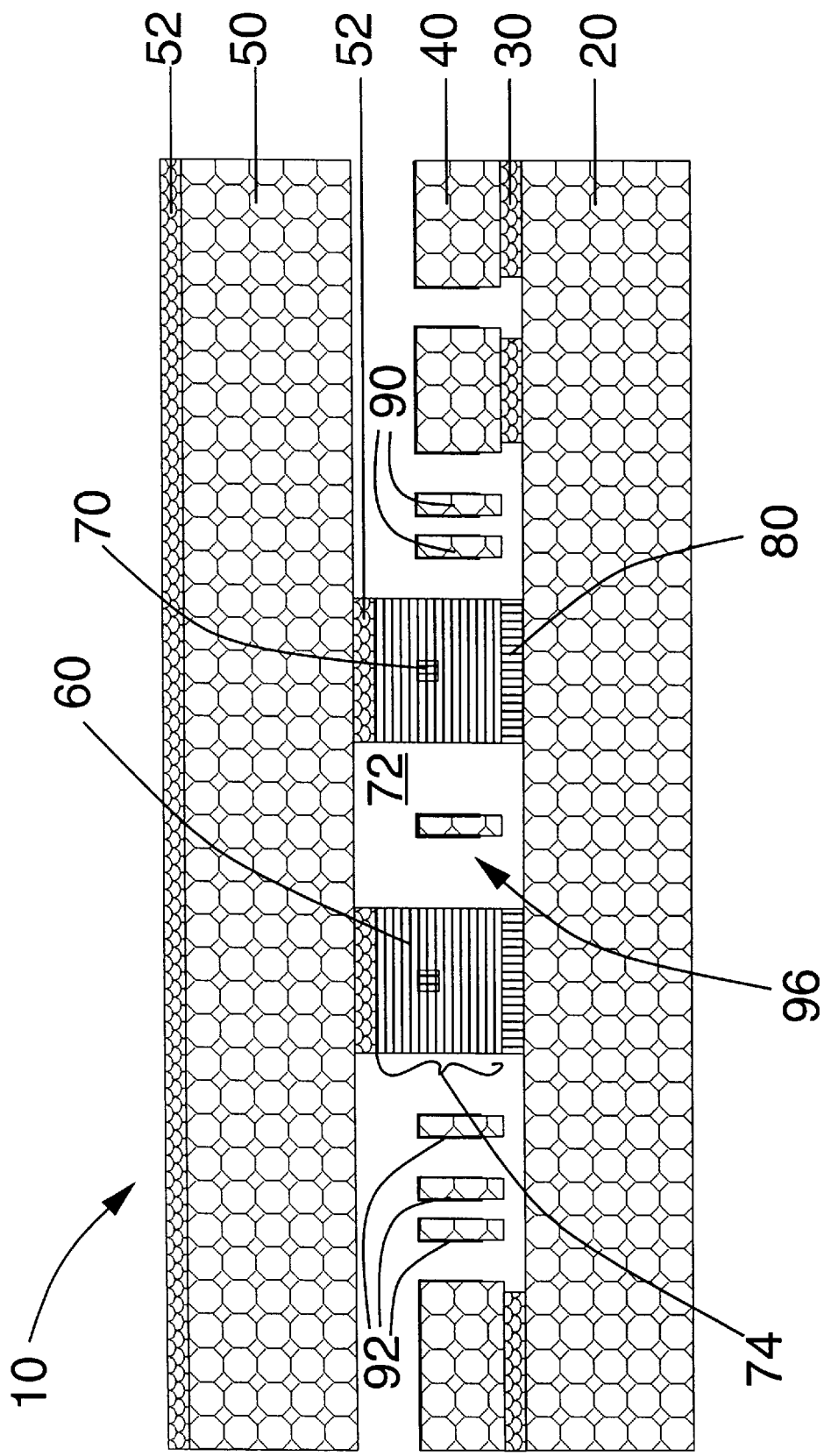
FIG. 1 is a side elevation view of a Micro-Opto-Electro-Mechanical System assembly for optical switching, constructed according to the principles of the present invention.

Referring now to the drawing, FIG. 1 shows a cut-away elevational side view 10 of a Micro-Opto-Electro-Mechanical System (MOEMS). The MOEMS is a combination of MEMS actuator 42 in FIG. 5 and micromachined PLC 54 in FIG. 6 to support a device configuration for integrated optic waveguide switches 400 as shown in FIG. 9. In MOEMS, the MEMS actuator 42 provides a switching functionality whereas the micromachined PLC 54 delivers a high-bandwidth interconnect network for signal transmission and routing. By combining MEMS actuators 42 and micromachined PLC 54 networks through a bonding layer 80, the normally passive PLCs can dynamically modify the optical communication network connectivity to any intended configurations within a short reconfiguration time. In FIG. 1, the separately fabricated MEMS actuator 42 and micromachined PLC 54 chips are packaged together by integrating a vertical mirror actuator layer 40 of MEMS actuator 42 chip into a micromachined gap 72 of waveguide layers 60, 70 on the micromachined PLC 54 chip. The vertical mirror 96, inserted into the waveguide gap 72 of micromachined PLC 54 chip, can dynamically move its position and provide an optical switching functionality by either transmitting or reflecting optical signals to the different channels 230, 240 of X-crossing network shown in FIG. 3. The separate fabrication of micromachined PLC 54 and MEMS actuator 42 chips avoids the fabrication compatibility problems as well as device configuration conflicts of mixed-technology Microsystems. By integrating MEMS structure layer 40 and PLC waveguide network layers 60, 70 into a single layer, the normally passive PLC 54 can perform active switching, filtering, and multiplexing functionality.

Figure 2:
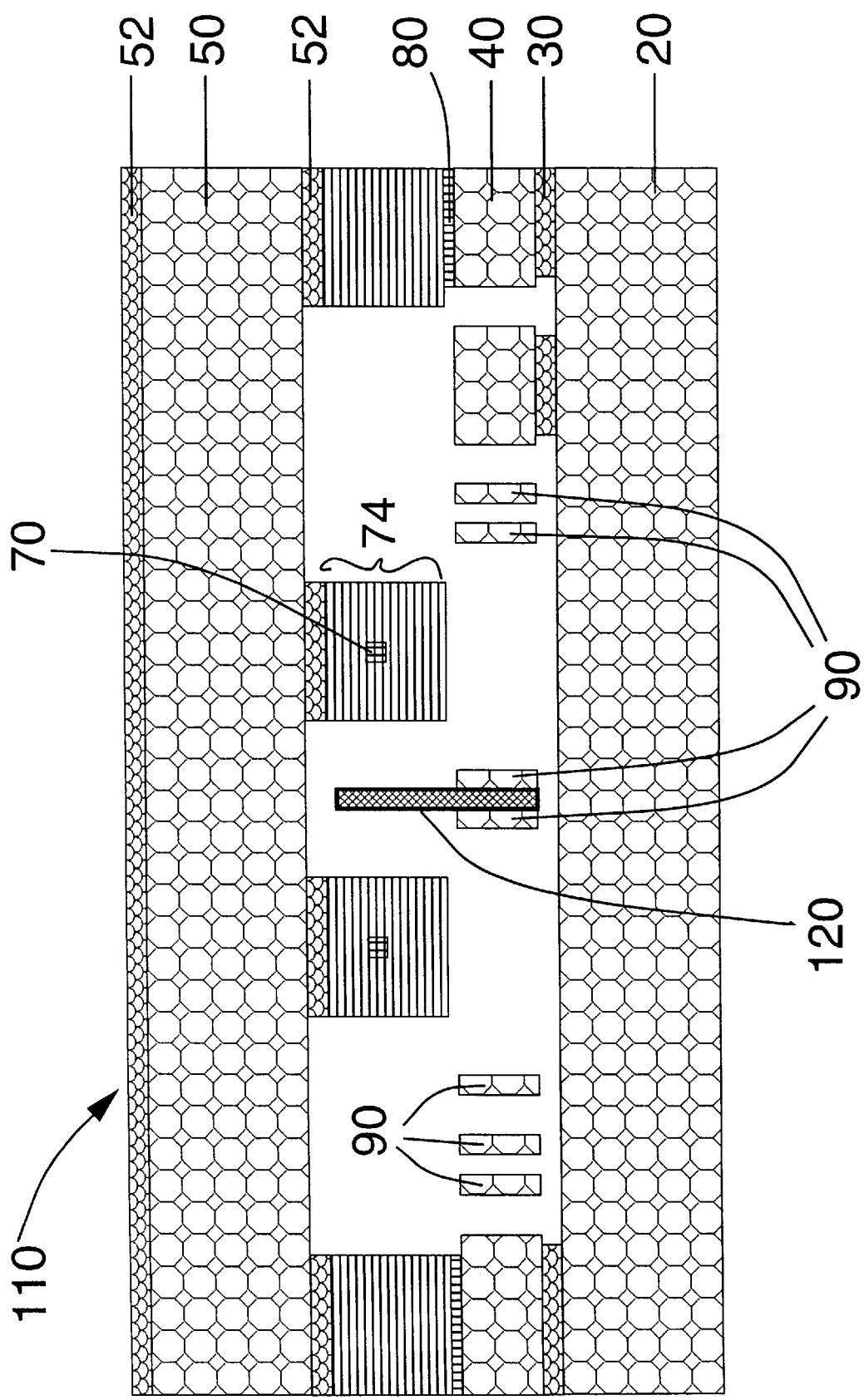
FIG. 2 is a side elevation view of another type of Micro-Opto-Electro-Mechanical System assembly for optical switching, and provides a view of out-of-plane and vertical side plates for a multifunctional integrated optic waveguide switching such as optical attenuation, wavelength-selective optical bandpass filtering and reflective switching.

FIG. 2 shows a cut-away elevational side view of another MOEMS structure 110 for integrated optic waveguide switches. Here the out-of-plane and vertical side plates 120 (i.e. mirror or multilayer thin-film filter) are attached into the MEMS actuator 42 chip and then the combined structure is inserted into the micromachined gap 72 of waveguide network layers. Unlike the MOEMS structure in FIG. 1, this structure does not require that the MEMS structure 40 be being inserted into the PLC waveguide layers 60, 70. The out-of-plane vertical side plate 120 can provide a multifunctional integrated optic waveguide switching capability such as optical attenuation, wavelength-selective optical bandpass filtering, and reflection switching by selecting a suitable type of plate for a different kind of application. The physical configuration of vertical side plates 120 are independent from fabrication processes and device configurations of both MEMS actuators and micromachined PLCs, since the vertical side plates 120 are separately constructed by using an independent fabrication process. A separate and independent fabrication of individual MOEMS components (i.e. vertical side plate 120, MEMS actuator 42 and micromachined PLC 54 chips) eliminates many possible problems associated with fabrication compatibility and device structure to enable a flexible hybrid microsystem.

The MOEMS is essentially an integrated and mixed-technology microsystem utilizing both optoelectronic interconnect and MEMS fabrication/packaging technologies. The letter in the term "MOEMS" stands for "Micro" (microscale), "Optical" (integrated optical waveguide networks and passive/active micro-optical components), "Electronic" (integrated circuits and multilayer metal interconnects), "Mechanical" (micromachined silicon sensors/actuators and passive alignment structures), and "Systems". It also represents these components being integrated into a single microstructure by using IC compatible microfabrication and assembly technologies. Using the proposed MOEMS structure 10, 110, integrated optic waveguide switch 400 arrays can be fabricated in a lithographic batch process without any fabrication compatibility problems. This integrated hybrid microsytem, i.e. MOEMS, provides the known benefits of MEMS technology (such as miniaturization, multiplicity, and microelectronics), in addition to a seamless integration of photonic and electronic devices into a single package.

In the MEMS technology, miniaturization allows structures of a few tens of micrometers to be fabricated with an accuracy in the sub-micrometer range, while multiplicity allows many structures to be simultaneously fabricated by pre-assembly and batch processes. Micro-optoelectronics provides the fabrication and integration of optoelectronic and electronic devices and components using conventional IC-compatible micromachining technology. And the resulting integration provides a smart microsystem having a variety of technologies (photonic, electronic and micromechanic). The current invention fabricates integrated optic waveguide switch array in a batch mode using a well-established IC fabrication process, thereby improving performance and reliability, and reducing costs.

In general the MEMS sensors and actuators can lead to a completely different class of mechanical, fluid, thermal, optical, biological, and chemical devices and components at micro scale, which would exhibit previously impossible improvements in reliability, performance, and cost. Multi-disciplinary efforts on design, fabrication, and packaging of MEMS sensors and actuators are currently underway to provide desired internal structures and functionality within the integrated microsystem. Some of the prominent sub-systems for MEMS may include: physical (position, velocity, acceleration, and pressure), biological and chemical sensors; motors; valves and pumps; optical mirrors, modulators, scanners, and switches; mechanical actuators, levers, flexures, bearings, hinges, springs, and couplings; seals, interfaces, and packages and others. Currently there exist a variety of MEMS actuation methods such as electrostatic, magnetic, thermal, shape memory alloy (SMA), impact, and piezoelectric mechanisms and so on by utilizing a wide array of physical effects. Depending on the application, a suitable MEMS actuation mechanism can be selected and employed by considering the amount of power available, suitable ranges of electrical voltages and currents, temperature requirements, size constraints, process integration, device packaging, and so on. In MEMS, bulk micromachining means that three-dimensional structures are etched into the bulk of crystalline or non-crystalline materials, whereas surface micromachining represents the features built up layer by layer on the surface of a substrate. In bulk micromachining, bulk materials such as silicon, quartz, GaAs, InP, Ge, SiC, and glass are sculpted by orientation-dependant (anisotropic) and/or orientation-independent (isotropic) etch processes. In a typical surface micromachining, dry etching defines the surface structures in x-y plane and wet etching releases them from the plane by undercutting a sacrificial layer.

Figure 3A:
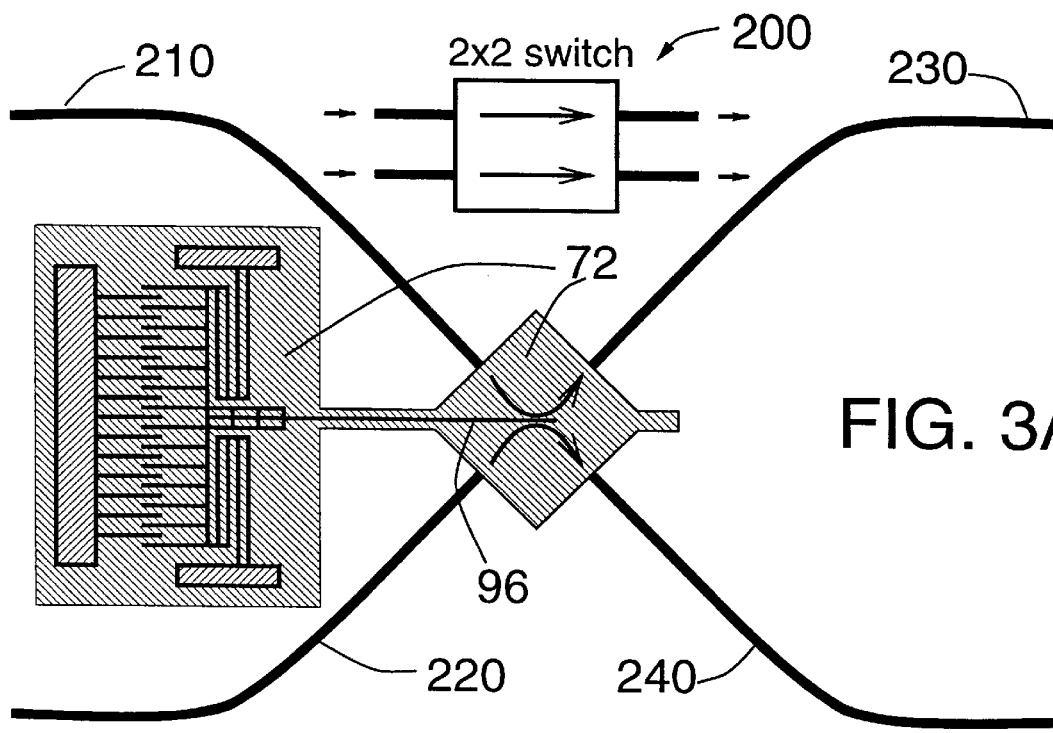
FIG. 3 (comprising FIGS. 3A–3B) is a diagrammatic view of an integrated optic waveguide switch, showing the details of micromachined PLC network and MEMS vertical mirror actuator on-MOEMS platform at both "cross" and "bar" states.
Figure 3B:
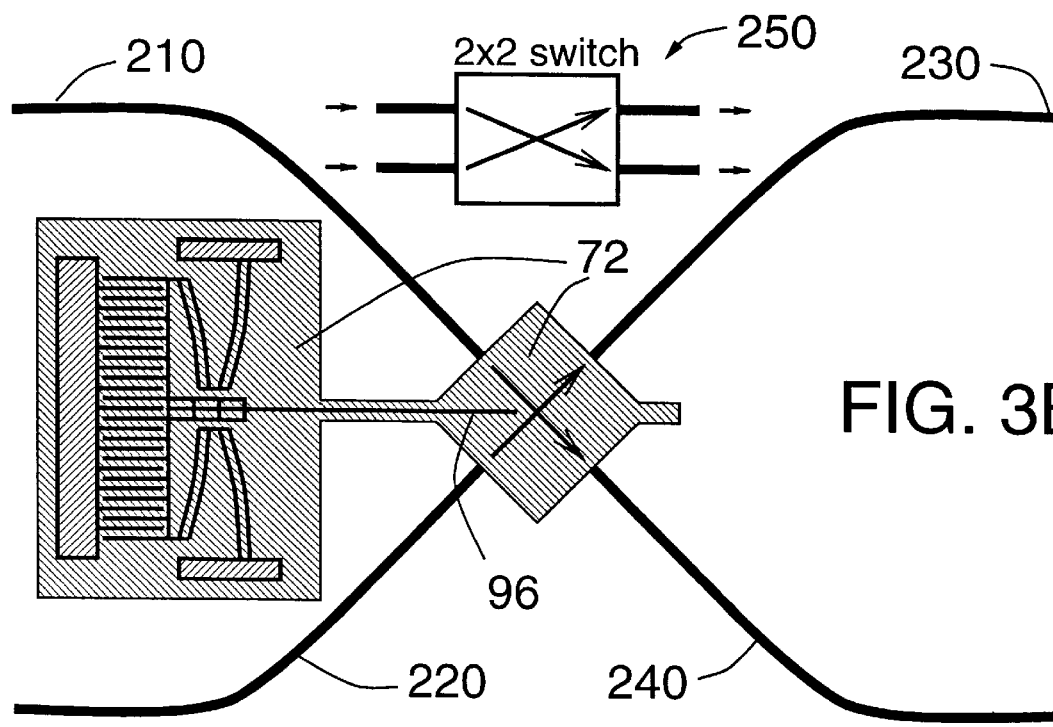

The FIG. 3 (comprising FIGS. 3A–3B) shows a diagrammatic view of an integrated optic waveguide switch, showing the details of micromachined PLC 54 network of FIG. 6 and MEMS vertical mirror actuator 42 of FIG. 5. The PLC network for integrated optic waveguide switch is a micromachined and disjoint X-crossing in essence, where the materials on disjoint gap area 72 is etched away to provide a free-space in the waveguide layers 74. The vertical mirror actuator 42 configures the disjoint X-crossing into either "bar" state 200 or "cross" state 250 by moving the vertical mirror 96 into or away from optical passages respectively. In "bar" state 200 as shown in FIG. 3A, optical signals will be reflected by the vertical mirror 96 such that the upper input channel 210 will be directed into the upper output channel 230 while the lower input channel 220 will be directed into the lower output channel 240. In "cross" state 250 as shown in FIG. 3B, optical signal will cross with each other by the absence of vertical mirror 96 such that the upper input channel 210 and the lower input channel 220 will be transferred to lower output channel 240 and upper output channel 230 respectively. Hence the integrated optic waveguide switch 400 can reconfigure the switch network through the presence or absence of vertical mirror 96 in the micromachined free-space disjoint area 72. The vertical mirror 96 actuation can be provided by a variety of MEMS actuators including vertical mirror comb driver 300 using deep silicon RIE, hinged vertical mirror actuator, out-of-plane vertical plate actuators, and so on. In the case of comb driver 300 as shown in FIG. 3, the electrostatic force caused by voltage across the moving 350 and stationary 340 combs can control the position of moving structure layer 40 wherein the vertical mirror 96 is constructed.

Figure 4:
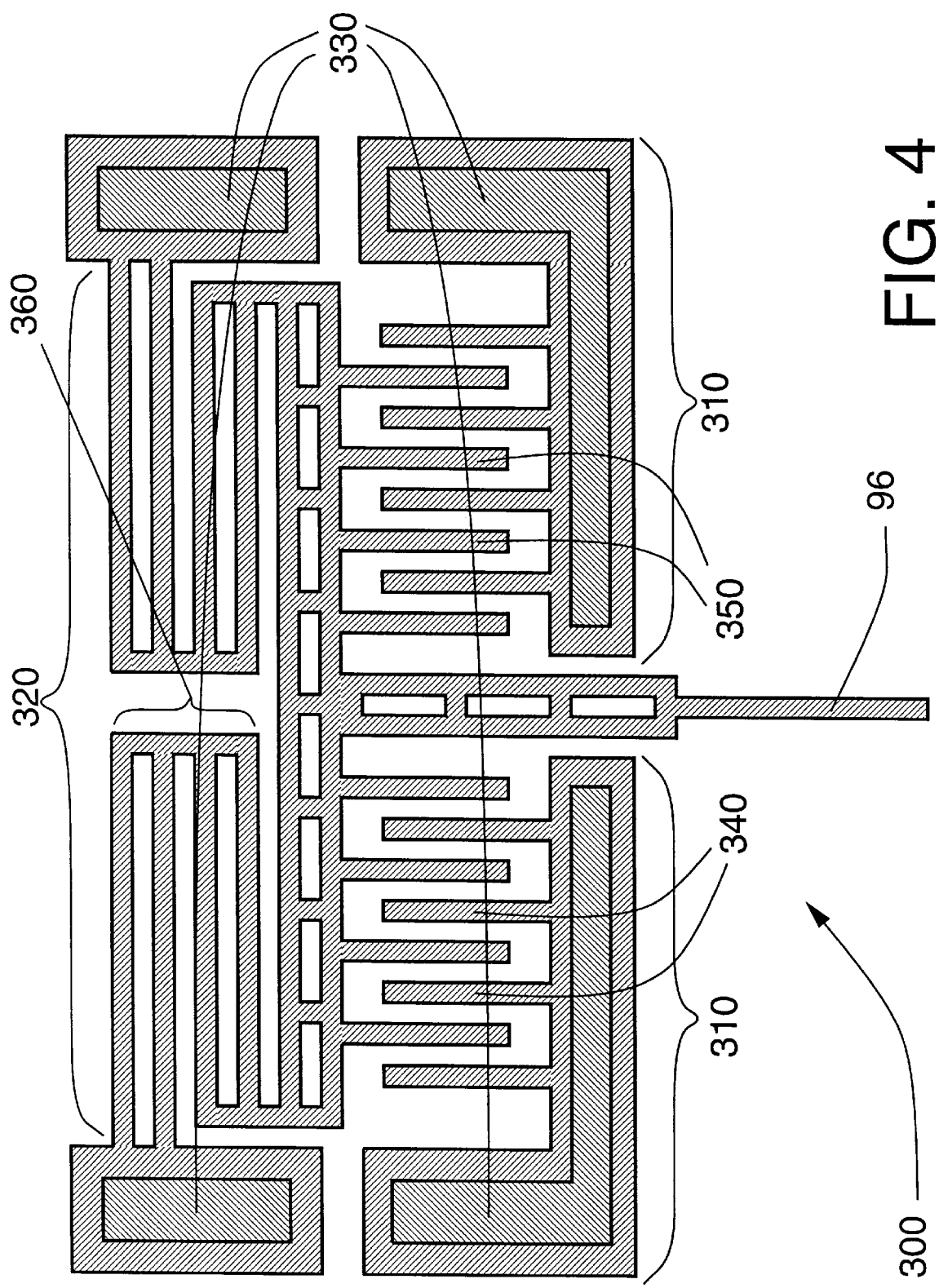
FIG. 4 is a diagrammatic view of a comb driver with vertical mirror, showing the details of comb driver and vertical mirror structures.

FIG. 4 is a diagrammatic view of a comb driver 300 with an integrated vertical mirror 96 within the structure layer and it shows a more detailed view of the structures in FIG. 3. The comb driver 300 is a simple and ingenious actuator, where one comb 350 is free to move while the other 340 is stationary. Both the moving and stationary combs are indirectly anchored to the substrate by structure-to-substrate layer anchors 330, which is an unetched sacrificial layer underneath the large-area-covering structure layer. When a voltage is applied between movable comb 350 and stationary comb 340, the moving comb 350 moves into the stationary comb 340 due to the electrostatic potential accumulated between the combs. The moving comb 350 can be supported by a flexible spring 360 where its movement and position will be determined by the geometrical configuration of combs 350, 340 and the flexible spring itself as well as driving voltage. A cantilevered beam suspension or a Crab leg suspension 360, which is constructed by joining two cantilever beams together, can provide the spring motion for the moving comb. The Crab leg suspension 360 is preferred since it eliminates the curve motion of cantilevered beam, thereby reducing the chances of opposing comb teeth 340, 350 touching and shorting out. The comb driver 300 can be implemented in a variety of configurations by combining unidirectional, bi-directional, linear, or rotary comb actuators. A high-aspect-ratio vertical mirror 96 can be constructed within the comb driver's structure layer 40 by using a deep-etching & shallow-diffusion process or a deep anisotropic reactive ion etching process. The comb driver 300 is a very well known MEMS component and the mathematical models of comb driver 300 like spring constant, resonant frequency, displacement as a function of comb finger spacing, finger number, thickness, and Voltage are well studied and extensively published in the leading MEMS journals.

Figure 5A:
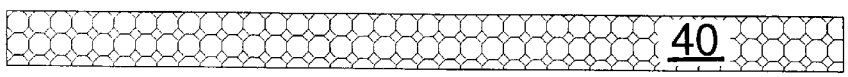
FIG. 5 (comprising FIGS. 5A–5F) is a side elevation view of MEMS actuator chip used in the MOEMS of FIGS. 1 and 2, showing the vertical mirror comb actuator at various stages of fabrication.
Figure 5B:
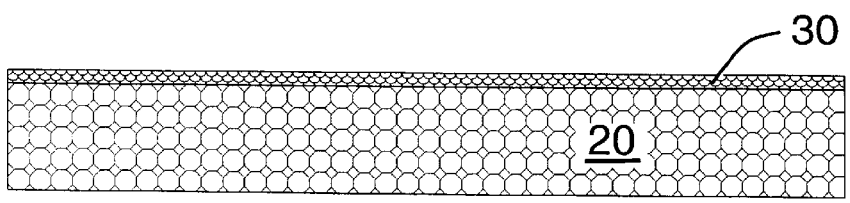

The fabrication steps of the MEMS actuator chip using vertical mirror comb drivers are described in FIG. 5 (comprising FIGS. 5A–5F). The FIG. 5A and FIG. 5B shows a double-side polished thin silicon wafer 40 and a thick silicon wafer 20 with a deposited glass layer 30 respectively. The thin silicon wafer 40 acts as a structure layer of comb driver 300 as well as a vertical mirror 96 layer, while the thick silicon wafer 20 becomes a substrate supporting the MEMS structural layer 40.

Figure 5C:
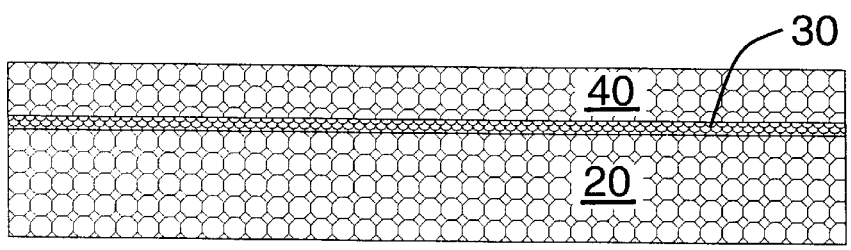

In FIG. 5C, the thin and thick silicon wafers 40, 20 are bonded together to form a silicon-on-insulator (SOI) structure.

Figure 5D:
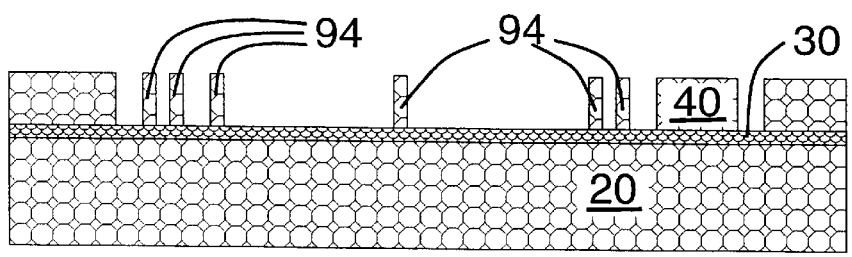

In FIG. 5D, the thin silicon structure layer 40 on the SOI wafer is lithographically patterned and then etched by deep silicon RIE processes utilizing an inductively-coupled plasma etch system. A layer of photoresist or metal mask can be used as an etch stop mask layer for the inductively-coupled plasma etch system, where the photoresist or metal layer will eventually be stripped away to result in the silicon microstructure 94 shown in FIG. 5D.

Figure 5E:
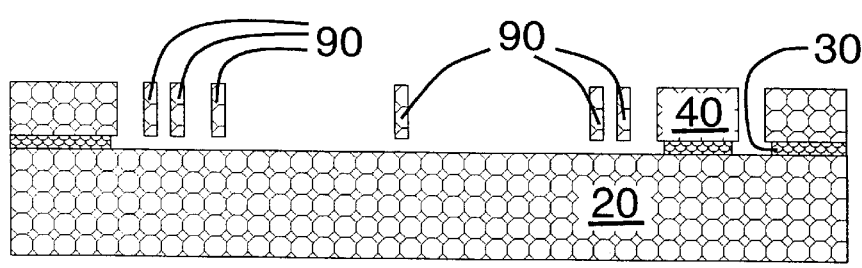

In FIG. 5E, the sacrificial layer 30 (i.e. deposited glass layer) is etched by HF solutions to lift off the moving MEMS structure layers 90.

Figure 5F:
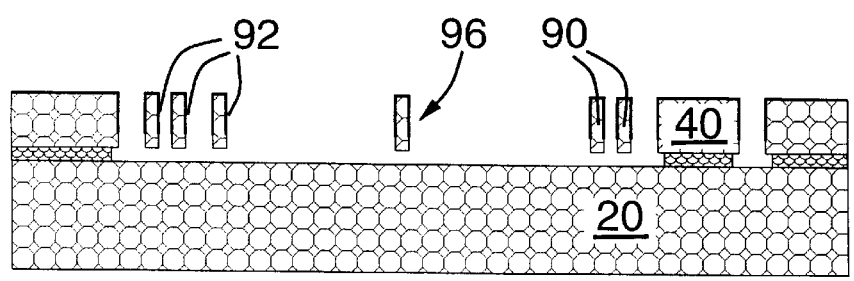

In FIG. 5F, a thin metal layer 92 is deposited on the top and side of the etched structure layer 90 to improve the reflectivity of vertical silicon mirror 96.

In surface micromachining, a high vertical structure can be constructed by building large flat structures horizontally and then rotate them on a hinge to an upright position as reported in polysilicon (poly-Si) hinges by Pister et al. Flat and long structural poly-Si features can be rotated out of the substrate plane and erected to create high vertical microstructures such as hot wire anemometers, micro windmill, and micro-optical bench with mirrors, gratings, and microlenses. The hinged vertical mirror actuator can also be used for the integrated optic waveguide switch as a MEMS mirror actuator. The hinged vertical mirror actuator is beneficial when a large mirror surface is required. However the friction around the hinges and the need to erect and assemble hinged vertical mirrors makes the practical implementation of hinged vertical mirror actuator somewhat difficult.

Essential components for optical communication systems are devices that have branching, switching, filtering, and wavelength multiplexing functions. Until recently the majority of these were fabricated using optical fibers or bulk optics, which showed inherent limitations in size, mass production, and large-scale integration for implementing a multi-functional subsystem. To overcome these limitations, many groups around the world have pursued a planar waveguide research, such as planar lightwave circuits 54 (PLCs) and silicon optical bench (SOB). These names came from the planar geometry of the waveguide circuits and the use of micromachined silicon chip to attach other optoelectronic components. Recently the PLCs 54 have reached a level of development to produce commercial components that can compete and surpass fiber-optic or bulk-optic components. Silica glass integrated waveguide circuits, made from glass composition similar to that of optical fibers, have shown low transmission losses, direct and low-loss interfacing to optical fibers, and capability to integrate various devices such as directional couplers, filters, splitters, combiners, star couplers, multiplexers, demultiplexers, and switches, into a single substrate. The PLCs 54 can also be micromachined to create a more flexible platform such that PLC 54 and SOB can be seamlessly integrated.

The FIG. 6 comprises FIGS. 6A to 6F, and shows a side elevation view of PLC 54 chip used in the MOEMS of FIGS. 1 and 2 at various stages of fabrication. The PLC 54 networks are constructed of layers of micromachined silica glasses 74, where the waveguide core 70 is buried between upper 64 and under silica glass buffer 62 layers.

Figure 6A:
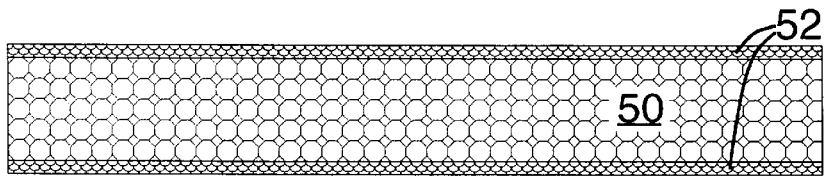
FIG. 6 (comprising FIGS. 6A–6F) is a side elevation view of PLC chip used in the MOEMS of FIG. 1 and FIG. 2, showing the PLC chip at various fabrication stages, wherein a PLC network is constructed of silica glass or polymer and a waveguide core is buried within waveguide buffer layers.

In FIG. 6A, a silicon substrate wafer 50 is thermally oxidized to form thin oxide layers 52 on both sides of the wafer.

Figure 6B:
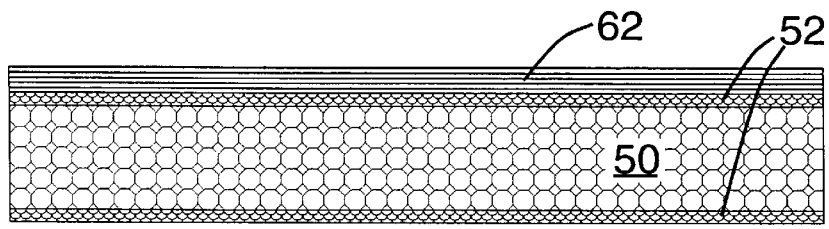

In FIG. 6B, an under buffer silica glass film 62 is deposited on top of the thin oxide layer 52.

Figure 6C:
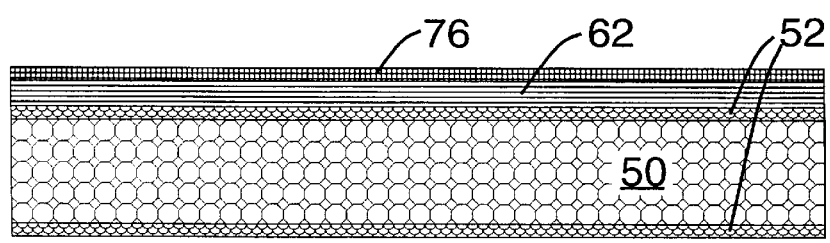

In FIG. 6C silica glass core film 76 with a slightly higher refractive index than the buffer layer is deposited on top of the under buffer layer 62. Then the deposited silica glass layers 62, 76 are annealed at high temperature for consolidation.

Figure 6D:
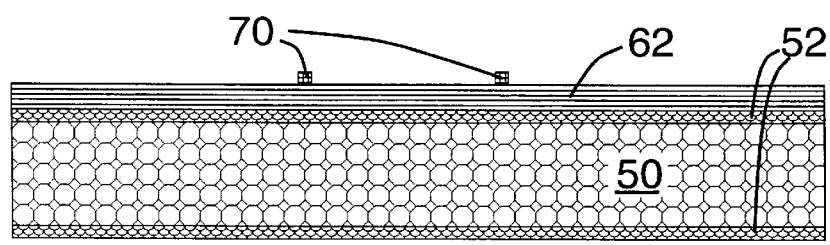

In FIG. 6D, a waveguide core 70 is patterned and fabricated by photolithography process and reactive ion etching (RIE) of the waveguide core layer.

Figure 6E:
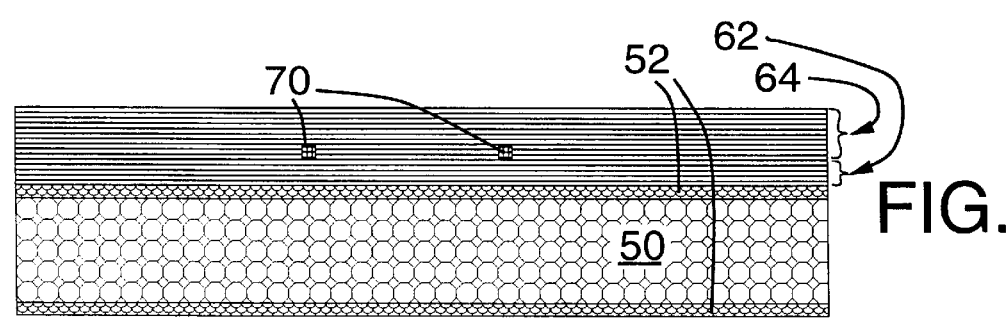

In FIG. 6E, an upper buffer silica glass film 64 is deposited on top of the patterned waveguide core 70 and then the final structure is consolidated again by annealing at high temperature.

Figure 6F:
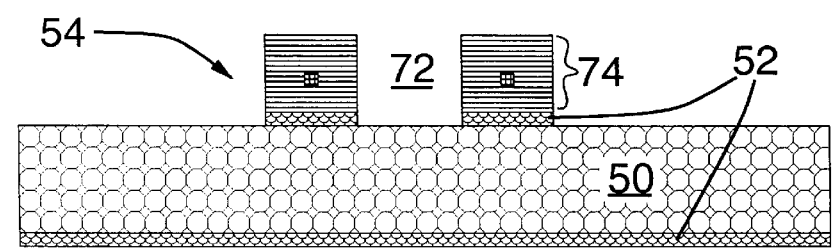

In FIG. 6F, a portion of material for the silica glass waveguide layer is etched away by RIE processes to form a free space gap 72 for X-crossing and MOEMS alignment microstructures.

In general the optical waveguides can successfully be formed using both crystalline and non-crystalline materials. Optical waveguides formed using non-crystalline materials generally provide low propagation loss and economical fabrication, although crystalline materials, including semiconductors, are necessary for performing active functions such as optical signal generation, detection, and modulation. Crystalline optical waveguides are a part of semiconductor lasers and are used in semiconductor photonic integrated circuits. Another type of crystalline optical waveguide is made in lithium niobate by titanium diffusion, where they can build modulators, switching arrays, and polarization controllers. Among non-crystalline materials, the silica glass is a choice of optical waveguide material for PLC 54 by the leading communication research groups. The silica glass waveguide has a stable and well-controlled refractive index with a very small propagation loss. It is highly transparent over a broad spectrum of optical wavelengths. Currently there exist several major ways of forming thick silica glass films for optical waveguides and these are flame hydrolysis deposition (FHD), chemical vapor deposition (CVD), and electron beam deposition. All of these fabrication methods use a reactive ion etching (RIE) to pattern a waveguide core and the patterned waveguide cores are generally buried within the layers of silica glass buffers. On the other hand, a polymer is another promising material for a low-cost PLC 54, though it suffers from problems related to long term stability, high power handling capability, waveguide shrinkage, and so on. It should be noted that the PLC 54 chip for the MOEMS application is not limited in utilizing a variety of optical waveguide materials including polymers such that it can take advantages of advancement and applicability of various waveguide material and processing technologies. Furthermore both single-mode and multi-mode electromagnetic wave propagation along the waveguide is supported on the PLC platform.

Figure 7:
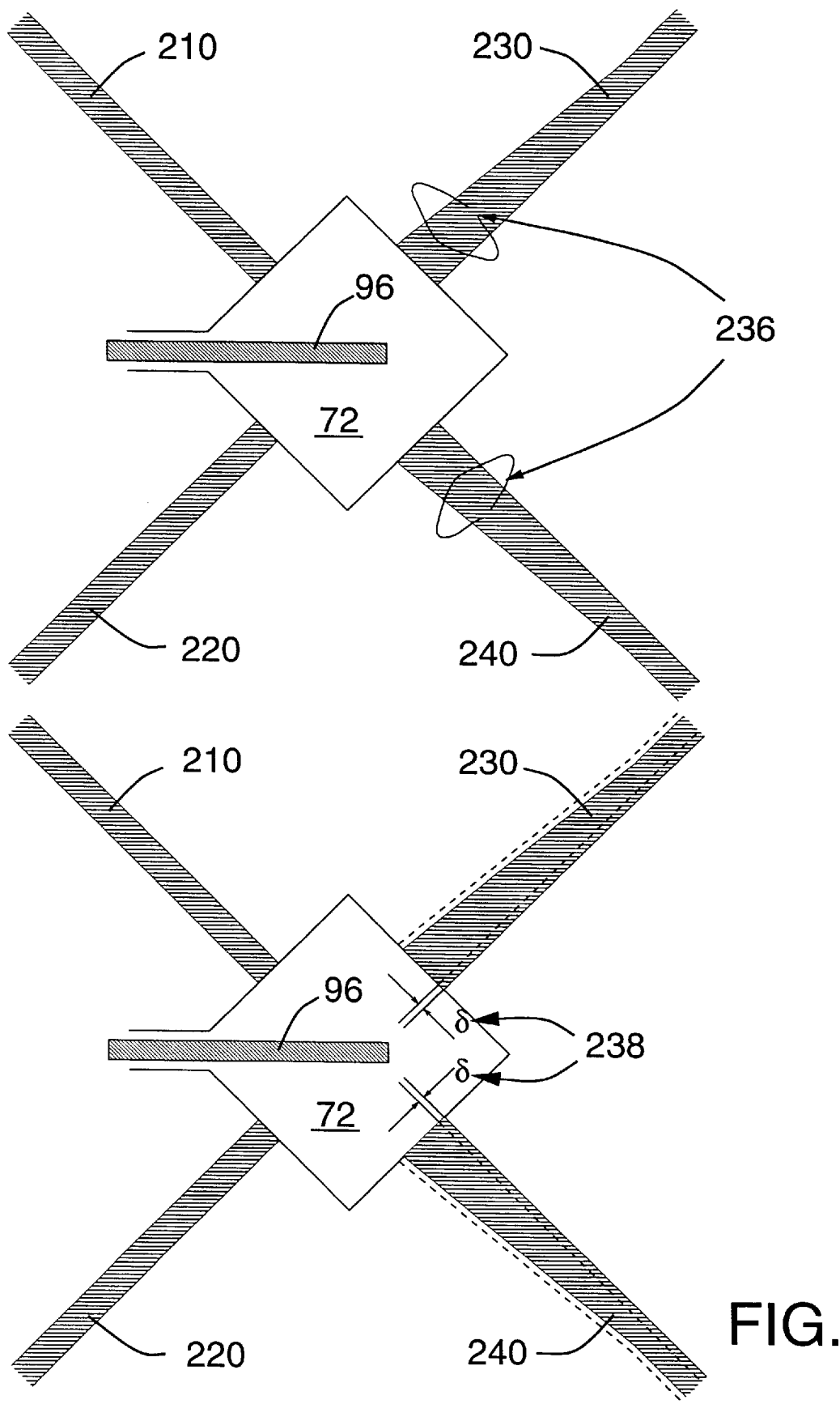
FIG. 7 is a detailed diagrammatic view of integrated optic waveguide network of FIG. 3, showing a micromachined and disjoint X-crossing on PLC, wherein tapered (either symmetric and asymmetric) and offset optical waveguide geometry at the receiving ports can be optimally conditioned by considering waveguide mode, waveguide gap in X-junction, vertical mirror thickness, core size, and X-junction crossing angle.

FIG. 7 is a diagrammatic view of tapered (either symmetric or asymmetric tapers) and offset optical waveguide geometry at the receiving ports of micromachined and disjoint X-crossings. The tapers 236 and offsets 238 of receiving waveguide ports 230, 240 can be lithographically defined and fabricated. By considering the design parameters such as waveguide gap 72, vertical mirror 96 thickness, core 70 size, and incident angles 270, 272 of X-crossing, the integrated optic waveguide switch can achieve both small insertion losses and equalized optical powers. A non-zero thickness vertical mirror 96 introduces the inevitable displacements D 280, 282 of the reflected beams, as shown in FIG. 8, relative to the optical paths of X-crossing networks employing an ideal zero-thickness vertical mirror. A simple displacement of receiving port's waveguide core can not simultaneously optimize the optical signal losses and power equalities for both "bar" and "cross" states of X-crossing network. The signal losses and power inequalities caused by the reflected beam displacement D 280, 282 can be significantly reduced by using a large waveguide core at the X-crossing's receiving ports. Since the reflected beam displacement D 280, 282 is confined within the waveguide layer, the large waveguide core needs an enlarged-width waveguide core without modifying the core thickness. Therefore the waveguide tapers 236 (either synrnetric or asymmetric) on the PLC platform can effectively construct a large waveguide core at the X-crossing's receiving ports. In addition to the tapered waveguide geometry, the waveguide offset: δ 238 at the receiving ports can also be utilized as a design parameter to improve the optical signal losses and power equalities. In MOEMS the waveguide offset 238 and taper 236 can be lithographically defined using different mask layouts and manufactured without modifying the existing fabrication processes. This feature is a unique and significant benefit of the MOEMS platform, which is unavailable to the conventional fiber or bulk-optic switches.

Figure 8A:
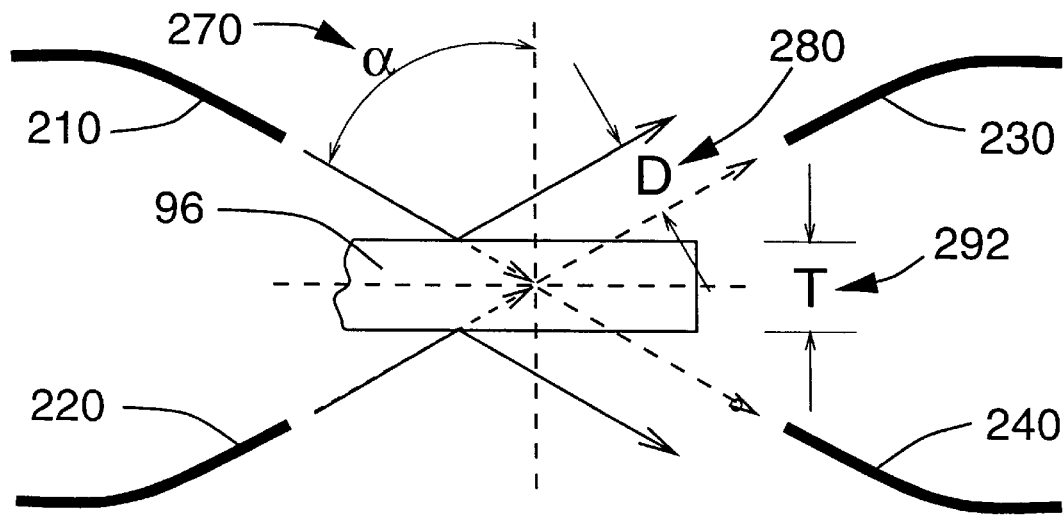
FIG. 8 (comprising FIGS. 8.A–8.B) is a diagrammatic view of incident angles on X-crossings, where the incident angle of X-crossings decides the required waveguide offset and the overall size of PLCs for integrated optic waveguide switches.
Figure 8B:
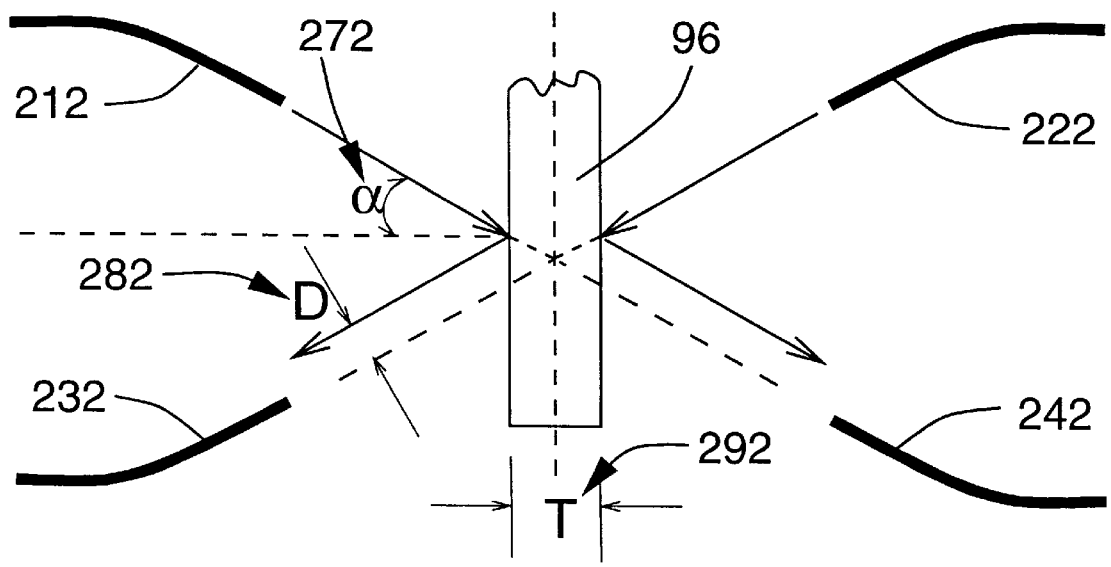

FIGS. 8A and 8B are diagrammatic views of incident angles on X-crossing networks, where the incident angles 270, 272 of X-crossings can lead to a different overall size of PLCs for integrated optic waveguide switches. The majority of PIC for X-crossing network is consumed by the waveguide bending network. The incident angles 270, 272 of X-crossing network is controlled by the amount of waveguide bending relative to the parallel input 210, 220 and output 230, 240 waveguide channels. In general the optical circuit designer does not have any control over the waveguide bending radius, since it is set by the core/cladding refractive index profiles of the optical waveguide network. With the fixed waveguide bending radius, the size of X-crossing network will grow as the X-crossing network's incident angle increases. A different type of X-crossing switch configuration is shown in FIG. 8B as it employs the vertical mirror's movement in a different direction compared to the one in FIG. 8A and it is particularly suitable for Add/Drop fiber switch applications. In FIG. 8B, the input channels 212, 222 and output channels 232, 242 are positioned at different locations compared to those 210, 220, 230, 240 in FIG. 8A and the waveguide bending directions relative to input/output channels 212, 222, 232, 242 are also accordingly altered.

In FIGS. 8A and 8B, the displacements D 280, 282 of reflected beams are related to the vertical mirror plate thickness: T 292 and incident angle of X-crossing network: α 270, 272 in the following formula.

$$D = T * SIN(\alpha)$$

It is widely anticipated that, in the near future, optical cross-connects with a large port count will become an essential component for the optical transport networks due to the growing capacity demands in optical fiber telecommunications. For optical cross-connect switching, the conventional bulk-optic mechanical switch suffers from large size, large mass, and slow switching time, whereas the fiber-optic mechanical switch suffers from a limited expandability toward a large-scale configuration due to the difficulties associated with fiber alignment and packaging. The integrated optic waveguide switch arrays, which are lithographically defined, overcome many obstacles mentioned above and provide low cost, reconfigurable, scalable, low loss, low crosstalk, compact size, and highly reliable optical cross-connects.

Figure 9A:
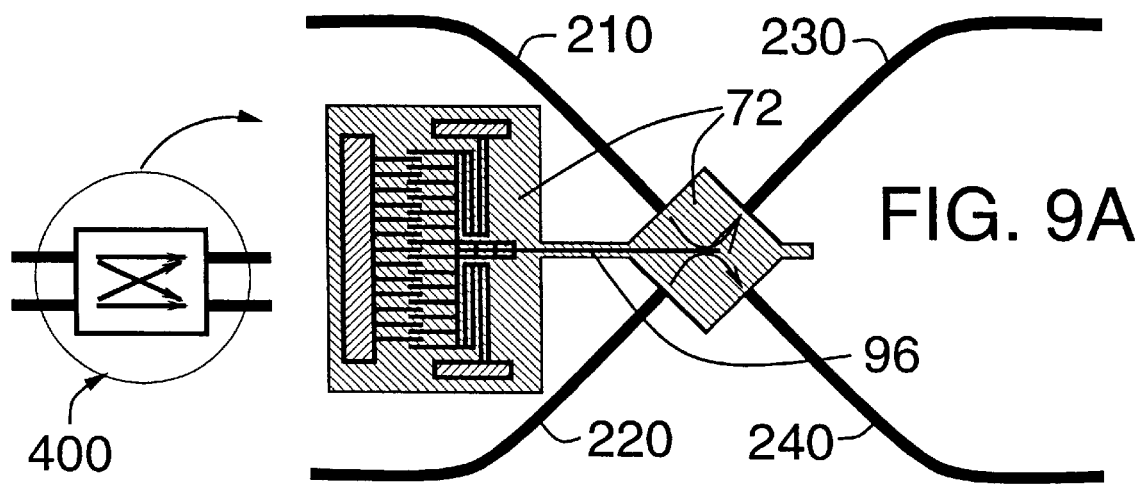
FIG. 9 (comprising FIGS. 9.A–9.C) is a diagrammatic view of optical cross-connect switch network by using multiples of integrated optic waveguide switches shown in FIG. 3, and the 2, 4, and 8 channel configurations of Benes network is illustrated as an example of non-blocking multistage network.
Figure 9B:
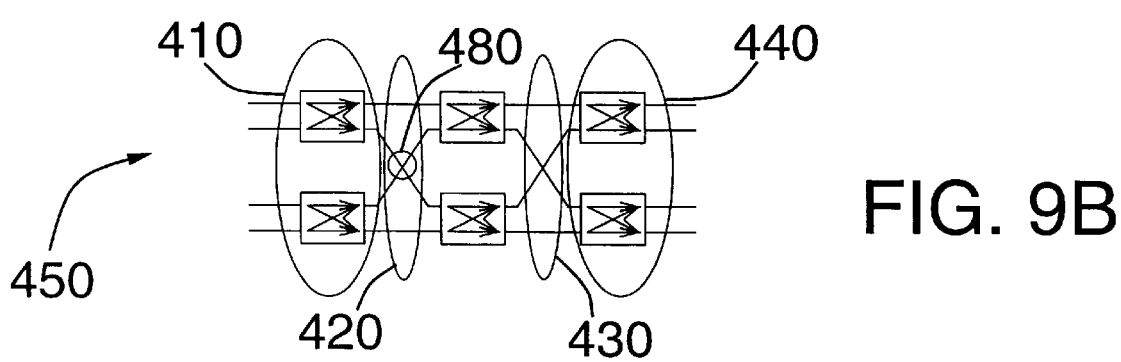
Figure 9C:
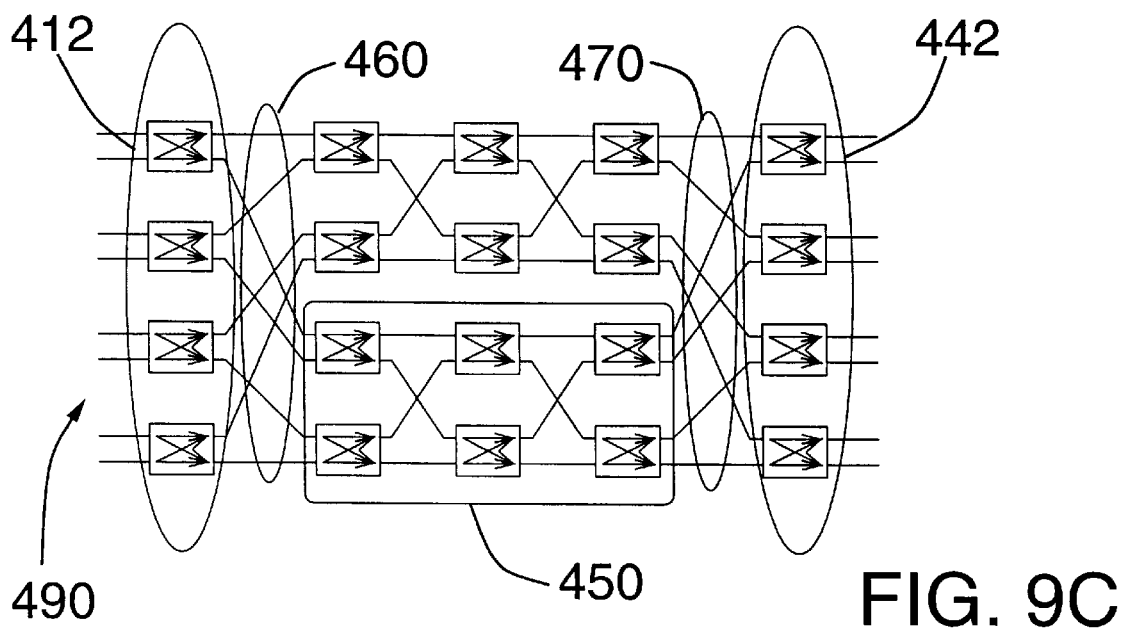

FIG. 9 (comprising FIGS. 9A–9C) is a diagrammatic view of optical crossconnect switch network by using multiples of integrated optic waveguide switches 400 illustrated in FIG. 3. The FIGS. 9A, 9B, and 9C show the 2, 4, and 8 channel configurations of Benes networks, a non-blocking multistage network. Assuming the number of channels are N, the Benes network is a rearrangeable switching array of permutation network which is capable of all N! permutations of the N inputs. The basic building block for the Benes network is a two-input/two-output crossbar switch 400 as shown in FIG. 9A. The FIG. 9A illustrates a symbolic notation as well as a MOEMS physical configuration for two-input/two-output crossbar switch 400. The large-scale Benes networks, like 4 and 8 channel Benes networks shown in FIGS. 9B and 9C respectively, are composed of input and output stages of switching elements 410, 412, 440, 442 connected by two Benes networks of half the size 400, 450 in the center stage. The connections between stages are inverse shuffle 420, 460 and perfect shuffle 430, 470 networks. The inverse shuffle 420, 460 and perfect shuffle 430, 470 connections involve a multiple of signal crossings 480. In electrical signal routing, the signal crossing requires a minimum of two metal interconnect layers. In optical interconnect networks, a single interconnect layer of PLC can effectively handle the multiple of signal crossings 480 with low losses and small crosstalks by using optical waveguide X-crossing networks. Therefore a practical and economic implementation of optical inverse shuffle 420, 460 and perfect shuffle 430, 470 connections is inherently supported in the PLC 54 platform, while the optical fiber-based shuffle network connections exhibit many difficulties in doing so due to its physical limitations on implementing X-crossing networks. When the recursive construction is completed for the Benes network, the network consists of (2logN −1) stages of switching elements, with N/2 switches in each stage. In general the multistage network like Benes network is scalable and very advantageous for a large-scale cross-connect switch application, since the number of switch element can grow at the rate of $O(N*logN)$ whereas the other type of non-scalable switch network (i.e. crossbar network) requires the number of switch elements on the order of $O(N*N)$. It should be noted that the optical cross-connect switching can be implemented by many other available types of multistage switch networks, such as Omega, Clos, dilated Benes, dilated Omega, crossbar, and so on.

Figure 10:
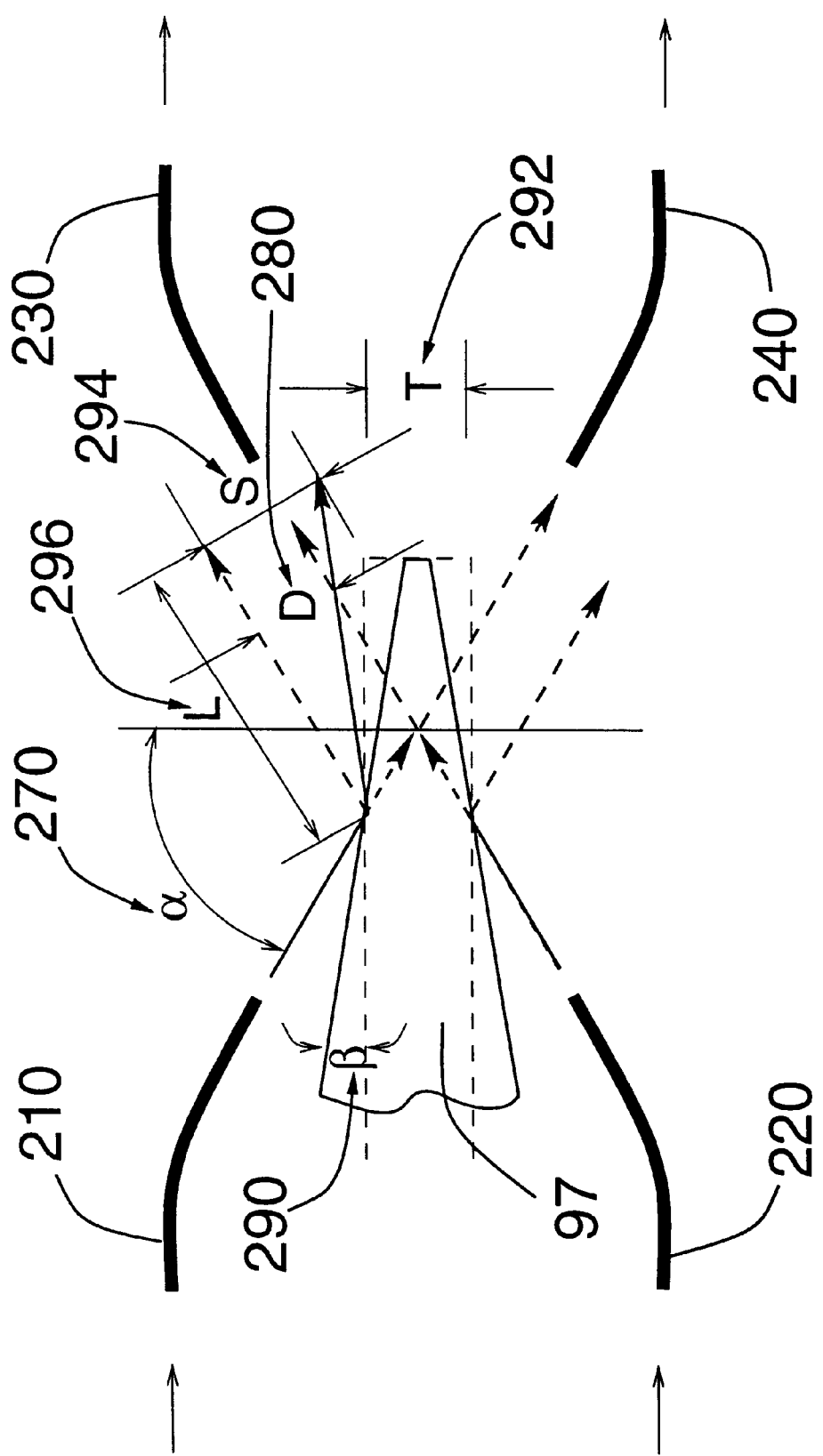
FIG. 10 is a diagrammatic view of non-parallel, wedge-shape vertical movable mirror plates that manipulate the direction of reflected optical beams within the integrated optic waveguide switch.

FIG. 10 is a diagrammatic view of a non-parallel and wedge-shaped vertical movable mirror plate 97 to manipulate the direction of reflected optical beams within the integrated optic waveguide switch. The non-parallel and wedge-shaped vertical movable mirror plate 97 can be lithographically defined and fabricated in the MOEMS platform without introducing any additional difficulties during the MOEMS fabrication and assembly processes. The taper angle: β 290 and thickness of wedge-shape vertical mirror: T 292 change the reflected beam's propagation passage relative to the receiving ports to cancel the effect of reflected beam displacement: D 280 at the X-crossing network's receiving port.

The reflected beam shift: S by the non-parallel and wedge-shaped vertical movable mirror plate 97 is linked to the wedge taper-angle: β 290 and the distance between vertical mirror and receiving port: L 296 in the following formula.

$$S = L*TAN(2*\beta)$$

It is feasible to cancel the effect of the reflected beam displacement D 280 by introducing the reflected beam shift S 294. And the designers can optimize the X-crossing networks by selecting appropriate values of design parameters such as vertical mirror plate thickness: T 292, incident angle of X-crossing network: α 270, wedge taper-angle: β 290, distance between vertical mirror and receiving port: L 296, waveguide tapers 236, and waveguide offset 238.

FIG. 11 (comprising FIGS. 11A–11D) is a diagrammatic view of a zero static power consumption comb actuator 500, showing its configuration at different stages of actuation sequences. The power consumption of the MEMS actuator is very important to expand the MOEMS platform and to implement a large-scale smart microsystem like the optical cross-connect switch with a large signal port count. Small power consumption of the MEMS actuator means a less demanding requirement for power supply or heat dissipation and, subsequently, a dense integration of integrated optic waveguide switch array is possible at a low cost. In general the device power consumption can be classified as dynamic and static power consumption. While it is impossible to eliminate the dynamic power consumption, many devices for computer systems and communication networks can achieve a zero or near-zero static power consumption as seen in CMOS circuits in VLSI systems. In MOEMS an innovative locking mechanism, as shown in FIGS. 11A through 11D, can provide a method of constructing a low power MEMS vertical mirror actuator, which would exhibit the near-zero static power consumption. After the dynamic reconfiguration of switch networks, the Add/Drop switch and cross-connect switch array can maintain its steady-state positions indefinitely without consuming any static power through a use of MEMS lock actuators.

Figure 11A:
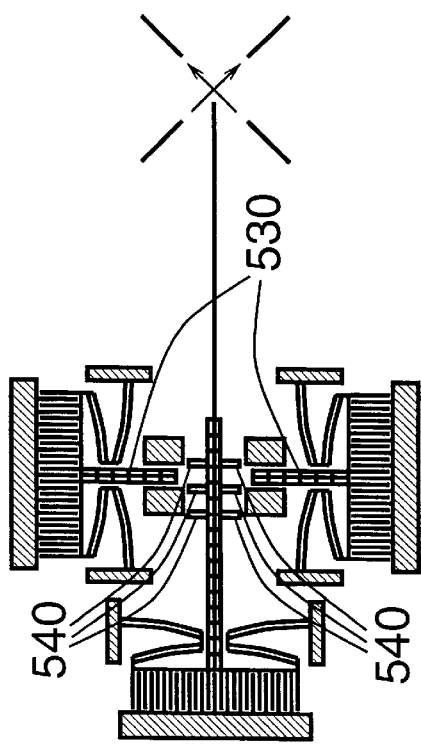
FIG. 11 (comprising FIGS. 11A–11D) is a diagrammatic view of zero static power consumption comb driver, showing its configurations at different stages of the actuation sequence.

FIG. 11A shows a diagrammatic view of zero static-power consumption comb actuator 500 at the steady state "bar" state. The zero static power consumption comb actuator is composed of three comb drivers: one vertical mirror comb driver for micro mirror actuation 510, one upper-lock comb driver 520 and one down-lock comb driver 560 to lock or release the vertical mirror comb driver 510. This configuration of comb actuator does not consume any power at the steady-state positions for "bar" and "cross" states, since no electric voltages drive any of the three comb drivers 510, 520, 560. The FIGS. 11A through 11D illustrates the zero static power consumption comb actuator 500 at the various transitional stages to change the steady-state position from "bar" state to "cross" state.

Figure 11B:
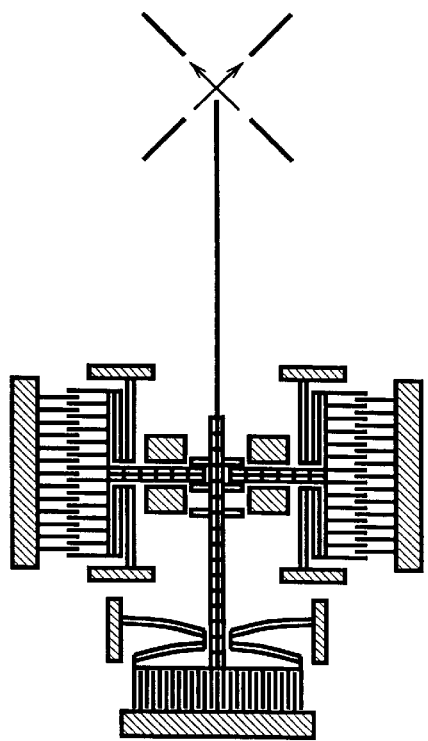

In FIG. 11B, by turning the electric voltages on at the upper-lock and down-lock comb drivers 520, 560, the keys 530 move backward from the lock microstructures 540. Then the zero static power consumption comb actuator 500 makes a transition from "lock position" to "release position" such that the vertical mirror comb driver 510 is free to move. The support microstructures 550 are utilized to linearly guide the motion of comb actuator keys 530 and to firmly engage in the "lock position" or "release position" by preventing distortion or bending of key microstructures.

Figure 11C:
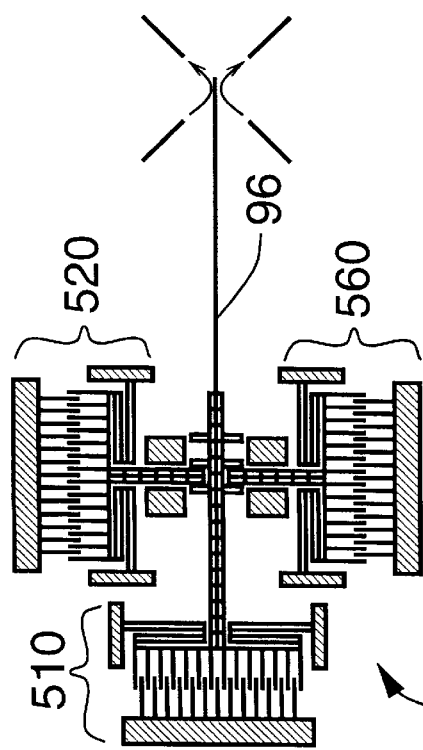

In FIG. 11C, the vertical mirror comb driver 510 is moving backward from the X-crossing network to establish the "cross" state, while both of upper-lock and down-lock comb drivers 520, 560 are holding "release position" as established in FIG. 11B.

Figure 11D:
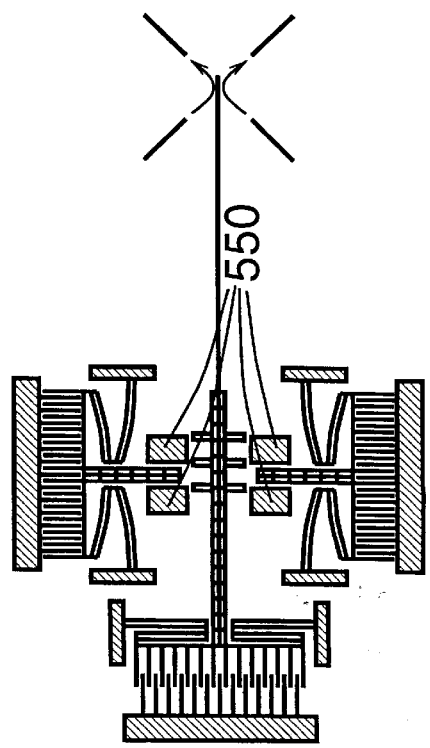

In FIG. 11D, by turning the electric voltages off at the upper-lock and down-lock comb drivers 520, 560, the keys 530 move forward to the lock microstructures 540. And the zero static power consumption comb actuator 500 makes a transition from "release position" to "lock position", while the "cross" state is maintained. Then the vertical mirror comb driver 510 can turn off its electric voltage and the "cross" state can be maintained due to the interlocks contributed by upper-lock and down-lock comb drivers 520, 560. Now the zero static power consumption comb actuator 500 enters the steady-state position of "cross" state without consuming any electrical powers.

Sometimes it is necessary to provide a multiple of electrical signal interconnect layers on the MOEMS platform to support the distribution and routing of MEMS actuator control signals. For a small scale MOEMS platform, such as 2×2 Add/Drop switch, the MEMS actuator control signals can be supplied through a multiple of wire bonds without having any dedicated signal interconnect layers. However, for a large scale MOEMS platform, it is often necessary to integrate signal and power routing layers into the MOEMS structure. FIG. 12 (comprising FIGS. 12A–12I) is a side elevation view of MEMS actuator 42 chip at various stages of fabrication, showing that the electrical interconnect layers can be constructed underneath the structural layer of comb driver as needed. Here the number of electrical interconnect layers can become more than one depending on the signal interconnect and power distribution requirements of MOEMS.

Figure 12A:
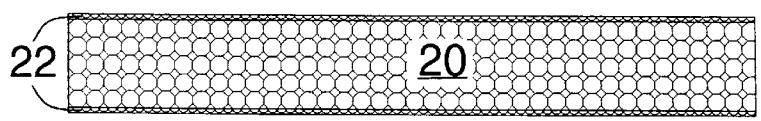
FIG. 12 (comprising FIGS. 12A–12I) is a side elevation view of MEMS actuator chip at various stages of fabrication, showing that the electrical signal interconnect layers can be constructed underneath the structural layer of comb driver, as necessary.

In FIG. 12A, the substrate wafer 20 is oxidized to form a thin of silicon dioxide layer 22 on both sides of wafer.

Figure 12B:
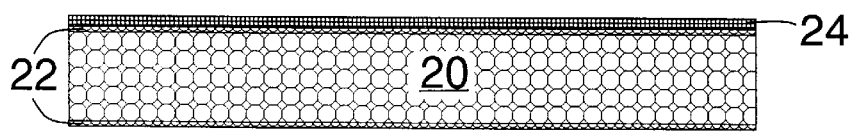

In FIG. 12B, a metal layer 24 is deposited on top of the silicon dioxide layer 22 to form a signal interconnect layer. Various types of metals can be utilized as signal interconnect layers depending on the subsequent fabrication and assembly processes to follow. For example, if a low temperature silicon-to-silicon wafer bonding is possible, it is feasible to use a conventional metal material such as aluminum, copper, and gold. However, if the wafer bonding requires a very high temperature processing, it is necessary to deposit a high-temperature-resistant material such as tungsten.

Figure 12C:
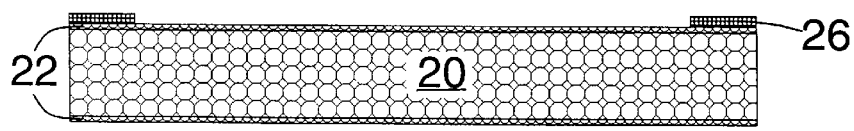

In FIG. 12C, the deposited metal layer 24 is photolithography patterned and etched to construct a metal interconnect line 26.

Figure 12D:
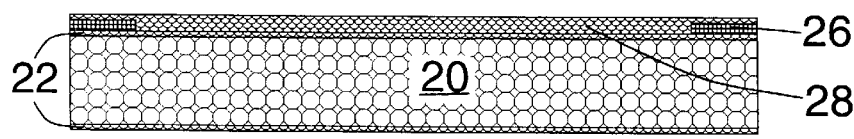

In FIG. 12D, a glass layer 28 is deposited to cover the patterned metal interconnect line 26. This glass layer 28 works as a bonding layer for silicon-to-silicon fusion bonding as well as a sacrificial layer for the MEMS actuators.

Figure 12E:
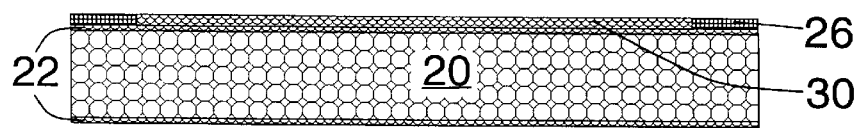

In FIG. 12E, the silicon substrate of FIG. 12D is processed by a chemical-mechanical polishing (CMP) steps to remove the glass layer on top of the patterned metal and to provide a extremely flat surface of glass 30 and metal interconnect line 26 for a subsequent wafer bonding.

Figure 12F:
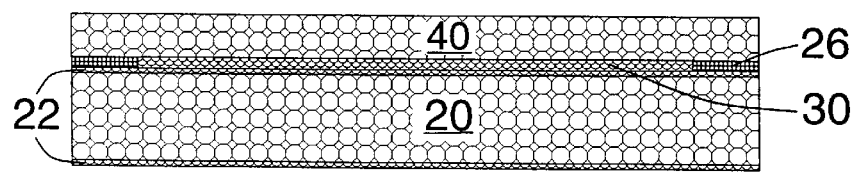

In FIG. 12F, the thin silicon wafer 40 is fusion bonded to the thick silicon substrate wafer 20 of FIG. 12E and the combined structure forms a silicon-on-insulator (SOI) wafer.

Figure 12G:
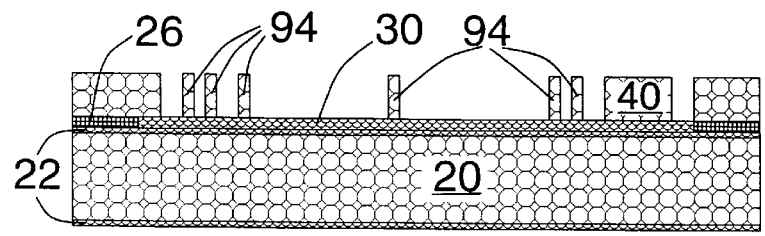

In FIG. 12G, the thin silicon structure layer on the SOI wafer is lithographically patterned and etched to produce silicon microstructures 94 through a deep silicon RIE process by using an inductively coupled plasma etch system.

Figure 12H:
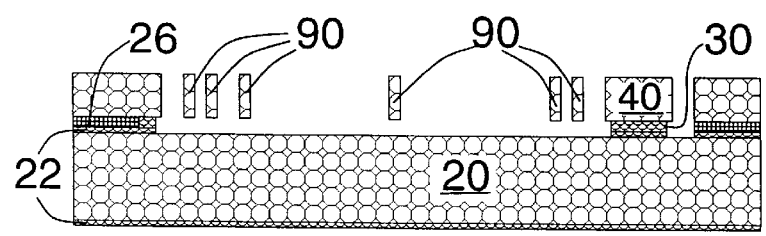

In FIG. 12H, the sacrificial layer 30 (i.e. deposited glass layer) is etched by HF solution to lift off the moving MEMS structure 90.

Figure 12I:
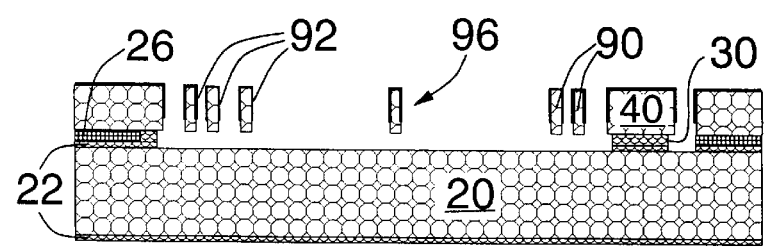

In FIG. 12I, a thin metal layer 92 is deposited on top and side of the etched structure layer to improve the reflectivity of vertical silicon mirror 96.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A multifunctional integrated optic waveguide add/drop multiplexing element comprising:

light-transmitting waveguides with a cross connecting configuration on a planar lightwave circuit and optical fibers coupled into said light-transmitting waveguides;

a four-sided trench with four substantially vertical sidewalls at a cross connecting location of said light-transmitting waveguides, wherein cores of said light-transmitting waveguides being individually terminated by said four substantially vertical sidewalls of said four-sided trench, and further wherein, said four-sided trench being defined and fabricated by lithographic micromachining processes;

a substantially long and narrow two-sided trench with two parallel and substantially vertical sidewalls, wherein said two-sided trench diagonally intersecting with said four-sided trench and extruding further beyond area defined by said four-sided trench without crossing any cores of said light-transmitting waveguides;

a substantially vertical movable plate placed into said four-sided trench and positioned along said two-sided trench in order to alter propagation and distribution of optical signals among four ports defined by said four-sided trench reflectively, refractively, diffractively, transmitively, or any combination thereof, wherein said optical signals comprising a single or a plurality of optical wavelength channels, and further wherein, said vertical movable plate capable of selectively adding, dropping, or any combination thereof entire or any particular spectral bands of said optical wavelength channels without influencing other pass-through signals of said optical wavelength channels;

tapered and shifted cores of light-transmitting waveguides at said four-sided trench in order to increase optical signal coupling efficiency, to improve optical signal uniformity, and to reduce alignment requirements for said vertical movable plate relative to sender and receiver ports at said four-sided trench, wherein said tapered cores being either symmetric or asymmetric; and a bulk-micromachined moving device on a substrate with means of attaching said vertical movable plate to itself and said bulk-micromachined moving device capable of displacing said vertical movable plate in and out of optical paths, partially or completely, within areas defined by said four-sided trench.

2. The multifunctional integrated optic waveguide add/drop multiplexing element as cited in claim 1, wherein said light-transmitting waveguides supporting a single or a plurality of electromagnetic wave propagation mode and said light-transmitting waveguides comprising a core and adjacent cladding composed of doped silica glass, polymer, SiON, or silicon materials, and further wherein, device structures for said light-transmitting waveguides comprising buried type, ridge-type, step-index, or graded-index waveguides.

3. The multifunctional integrated optic waveguide add/drop multiplexing element as cited in claim 1, wherein said light-transmitting waveguides comprising tilted waveguide sidewalls at said four-sided trench in order to reduce back-reflection of said optical signals, and further wherein, said tilted waveguide sidewalls being defined and fabricated by lithographic micromachining processes.

4. The multifunctional integrated optic waveguide add/drop multiplexing element as cited in claim 1, wherein said bulk-micromachined moving device comprises MEMS actuator utilizing electrostatic comb driver, crab leg suspension spring, and electrically conductive pathways to distribute control signals.

5. The multifunctional integrated optic waveguide add/drop multiplexing element as cited in claim 1, wherein said bulk-micromachined moving device providing horizontal or vertical motion of said vertical movable plate in order to alter propagation and distribution of optical signals at said four-sided trench.

6. The multifunctional integrated optic waveguide add/drop multiplexing element as cited in claim 1, further comprising a plurality of electrically conductive pathway, photonic chip, and electronic chip on said planar lightwave circuit.

7. The multifunctional integrated optic waveguide add/drop multiplexing element as cited in claim 1, wherein said vertical movable plate further comprises separately fabricated and substantially flat optical component including wavelength-sensitive multilayer thin-film filter plate, reflective thin-film plate, diffractive thin-film plate, transmitive thin-film plate, polarization-sensitive thin-film plate, or any combination thereof, and further wherein, said vertical movable plate being subsequently assembled within structural layer of said moving device or extruded out of structural layer of said moving device.

8. The multifunctional integrated optic waveguide add/drop multiplexing element as cited in claim 1, wherein said vertical movable plate comprises non-parallel, wedge-shape, and substantially-flat or substantially-contoured smooth planes of front and back surfaces in order to alter propagation and distribution of said optical signals.

9. The multifunctional integrated optic waveguide add/drop multiplexing element as cited in claim 1, further comprising a plurality of said bulk-micromachined moving device with said vertical movable plate.

10. The multifunctional integrated optic waveguide add/drop multiplexing element as cited in claim 1, both said four-sided trench and said two-sided trench being filled with air or index-matching fluid.

11. The multifunctional integrated optic waveguide add/drop multiplexing element as cited in claim 1, further constructing a plurality of said multifunctional integrated optic waveguide add/drop multiplexing element in an array configuration on said planar lightwave circuit.

12. The multifunctional integrated optic waveguide add/drop multiplexing element as cited in claim 1, further constructing a plurality of said multifunctional integrated optic waveguide add/drop multiplexing element and being interconnected serially, parallel, or any combination thereof on said planar lightwave circuit.

13. The multifunctional integrated optic waveguide add/drop multiplexing element as cited in claim 1, said bulk-micromachined moving device capable of partially or completely displacing said vertical movable plate, with a small step, in and out of said optical paths in order to provide a variable optical attenuation.

14. The multifunctional integrated optic waveguide add/drop multiplexing element as cited in claim 1, further comprising a substantially large trench connected to one end of said two-sided trench in order to accommodate said bulk-micromachined moving device into a layer, within which said light-transmitting waveguide resides, and said vertical movable plate further comprising substantially-flat or substantially-contoured smooth planes of front and back surfaces coated with a layer of reflective material, and further wherein, said vertical movable plate being fabricated using a structural layer of said bulk-micromachined moving device.

15. The multifunctional integrated optic waveguide add/drop multiplexing element as cited in claims further capable of reducing into one-input/two-output or two-input/one-output configurations by using only one side of said vertical movable plate and capable of displacing said one side of said vertical movable plate into cross connecting location of said light-transmitting waveguides.

16. A zero-static power consumption micro electromechanical actuator comprising:

an electrostatic comb driver with vertical movable plate having lock microstructures, wherein said lock microstructures being integrated into structural layer of said electrostatic comb driver;

a plurality of electrostatic comb drivers having key microstructures, wherein said key microstructures being integrated into structural layer of said electrostatic comb drivers, and further wherein, said key microstructures and said lock microstructures capable of engaging or disengaging with each other; and said electrostatic comb driver with vertical movable plate positions itself in a steady-state lock state with zero or minimum power consumption if said key microstructures are engaged with said lock microstructures, and said electrostatic comb driver with vertical movable plate positions itself in a freely movable release position if said key microstructures are disengaged from said lock microstructures.

17. The zero-static power consumption micro electromechanical actuator as cited in claim 16, further comprising a plurality of support microstructures to guide motions of electrostatic comb drivers and to allow microstructures of said electrostatic comb drivers firmly engaged with each other without introducing substantial bending or distortion during said steady-state lock state or said freely movable release state.

\* \* \* \* \*